United States Patent

Muthu

(10) Patent No.: US 6,411,046 B1
(45) Date of Patent: Jun. 25, 2002

(54) EFFECTIVE MODELING OF CIE XY COORDINATES FOR A PLURALITY OF LEDS FOR WHITE LED LIGHT CONTROL

(75) Inventor: Subramanian Muthu, Tarrytown, NY (US)

(73) Assignee: Koninklijke Philips Electronics, N. V., Eindhoven (NL)

( * ) Notice: Subject to any disclaimer, the term of this patent is extended or adjusted under 35 U.S.C. 154(b) by 0 days.

(21) Appl. No.: 09/749,170

(22) Filed: Dec. 27, 2000

(51) Int. Cl.[7] .............................................. G05F 1/00
(52) U.S. Cl. ...................................... 315/309; 362/800
(58) Field of Search ........................ 315/309; 362/227, 362/230, 231, 800; 250/553

(56) References Cited

U.S. PATENT DOCUMENTS

| | | | |
|---|---|---|---|
| 5,836,676 A | 11/1998 | Ando et al. | 362/244 |
| 5,851,063 A | 12/1998 | Doughty et al. | 362/231 |
| 5,949,346 A * | 9/1999 | Suzuki et al. | 116/286 |

FOREIGN PATENT DOCUMENTS

| | | | |
|---|---|---|---|
| EP | 0878969 A2 | 11/1998 | H04N/9/30 |
| JP | 09214000 A | 8/1997 | H01L/33/00 |

* cited by examiner

Primary Examiner—Don Wong
Assistant Examiner—Thuy Vinh Tran
(74) Attorney, Agent, or Firm—Aaron Waxler

(57) ABSTRACT

The present invention describes a method and luminaire for driving an array of LEDs with at least one LED in each of a plurality of colors in a luminaire. This method controls the light output and color of the LEDs by measuring color coordinates for each LED light source for different temperatures, storing the expressions of the color coordinates as a function of the temperatures, deriving equations for the color coordinates as a function of temperature, calculating the color coordinates and lumen output fractions on-line, and controlling the light output and color of said LEDs based upon the calculated color coordinates and lumen output fractions.

15 Claims, 6 Drawing Sheets

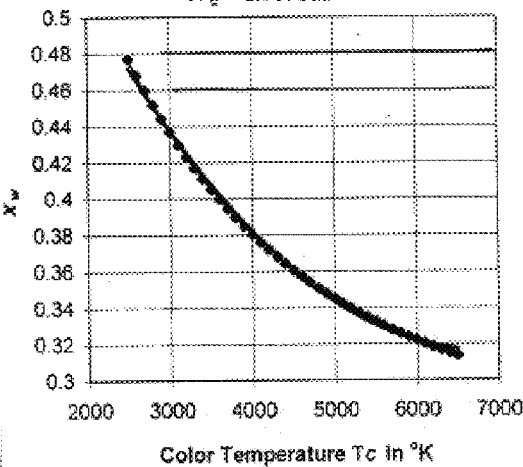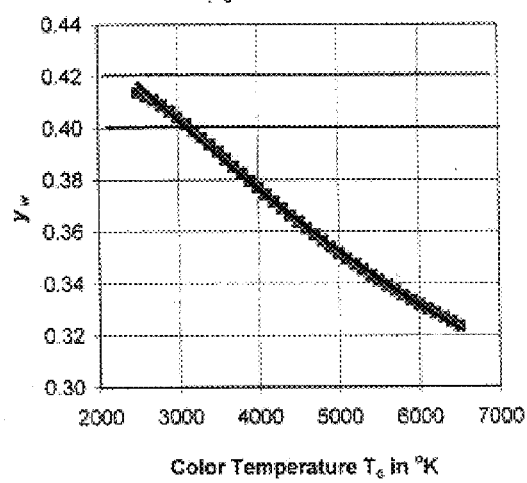
Fig. 6A
Fig. 6B

US 6,411,046 B1

EFFECTIVE MODELING OF CIE XY COORDINATES FOR A PLURALITY OF LEDS FOR WHITE LED LIGHT CONTROL

BACKGROUND OF THE INVENTION

The invention relates to a luminaire with a multicolored array of light emitting diodes (LEDS). More particularly, the invention relates to a white light emitting luminaire where the light output and the color of the white light produced by the luminaire vary with temperature.

U.S. Pat. No. 5,851,063, assigned to General Electric Company, herein incorporated by reference, describes a system of at least three multi-colored LED's having an optimized color rendering index by proper selection of the wavelengths of each LED. The reference also includes a method which defines the chromaticity of an LED system by specifying the desired chromaticity of the system, calculating the theoretical x, y, and z CIE (Commission Internationale de L'Eclairage) coordinates of the desired chromaticity on a blackbody locus, and providing light from each LED at the selected wavelength based on those coordinates.

However, under actual conditions, light output for LEDs varies with temperature of the LEDs. This variation does not occur uniformly for each color. In a block of LEDs of a given color, the light output will vary, for example, if one or more of the LEDs fails. Given the factors which can affect the light output and color temperature of any array of LEDs, it would be desirable to automatically control light output and color temperature, especially in a white-light emitting luminaire.

It would also be desirable to control the color and light output of a white light emitting luminaire automatically, continuously, on-line, and with small sized arrays.

SUMMARY OF THE INVENTION

According to the invention, an array of LEDs, made up of at least one LED in each of a plurality of colors in a luminaire, is driven by an experimental method. First, electrical current is supplied to the LEDs in each color, so that they have a light output with a nominal continuous value during ordinary operation. Then CIE xy coordinates for each LED light source are measured for different temperatures. The CIE xy coordinates for the LED light sources are expressed as a function of temperature of the LED light source and the expressions are stored in memory. Equations are derived for the CIE x and CIE y coordinates as a function of temperature and are used to calculate the CIE xy coordinates and lumen output fractions while on line. Light output and color of the LEDs in controlled based upon the calculated xy coordinates and lumen output fraction.

In this approach, the CIE xy coordinates for the LED light sources are first measured for different temperatures experimentally for the entire operating range. Then, based on the experimental data, the equations for the CIE x and CIE y coordinates are derived as a function of temperature using polynomials. If the CIE xy coordinates are highly non-linear, then higher order polynomials are used to derive the equations.

Since the CIE xy coordinates are expressed as a function of temperature, the reference lumens are calculated on-line. Therefore, continuous control is provided for the color control. This method is well suited for variable color and lumen control. Measured light outputs are feed-back to a controller along with the desired outputs, which may be set by user controls, and changes to the power supply for color blocks are made as necessary. Color of the white light is thus automatically controlled without regard to factors that may cause it to change. The user inputs permit varying the desired color of the white light to either warm white (more red output) or cool white (more blue output).

In accordance with an embodiment of the invention, for a fixed color of the white light, the reference lumens are calculated off-line first and are expressed as a function of temperature by using polynomials. The temperature is inputted and these equations are then used to obtain the reference lumens on-line.

A further aspect of the invention provides a method to vary the color temperature of the white light linearly. An example of this variance is shifting the color temperature from warm-white to daylight-white. This is achieved by expressing the CIE xy coordinates of the white light on the blackbody locus as a function of color temperature using polynomials. Knowing the CIE xy coordinates of the white light for the desired color point and the CIE xy coordinates of the LED light sources Ad depending on the temperature, the required reference lumen output for each of the colored LED light sources are calculated. These lumens outputs are supplied to a lumen output control system as reference which regulates the lumen output of the LED light sources regardless of temperature and aging.

BRIEF DESCRIPTION OF THE DRAWING

FIG. 6A is a graph showing the variation of CIE $x_W$ coordinate with color temperature for a white LED array as a function of color temperature; and FIG. 6B is a graph showing the variation of CIE $y_W$ coordinate with color temperature for a white LED array as a function of color temperature.

DETAILED DESCRIPTION OF THE PREFERRED EMBODIMENTS

Figure 1:
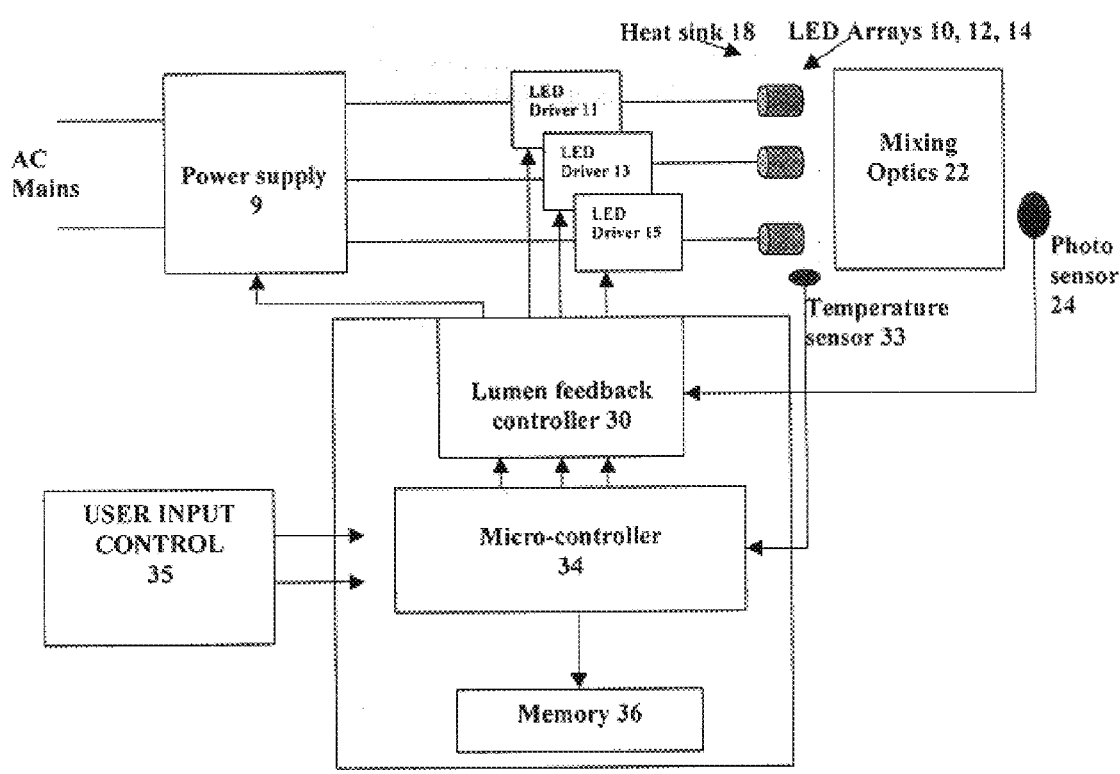
FIG. 1 is a schematic diagram of an LED luminaire.
Figure 2A:
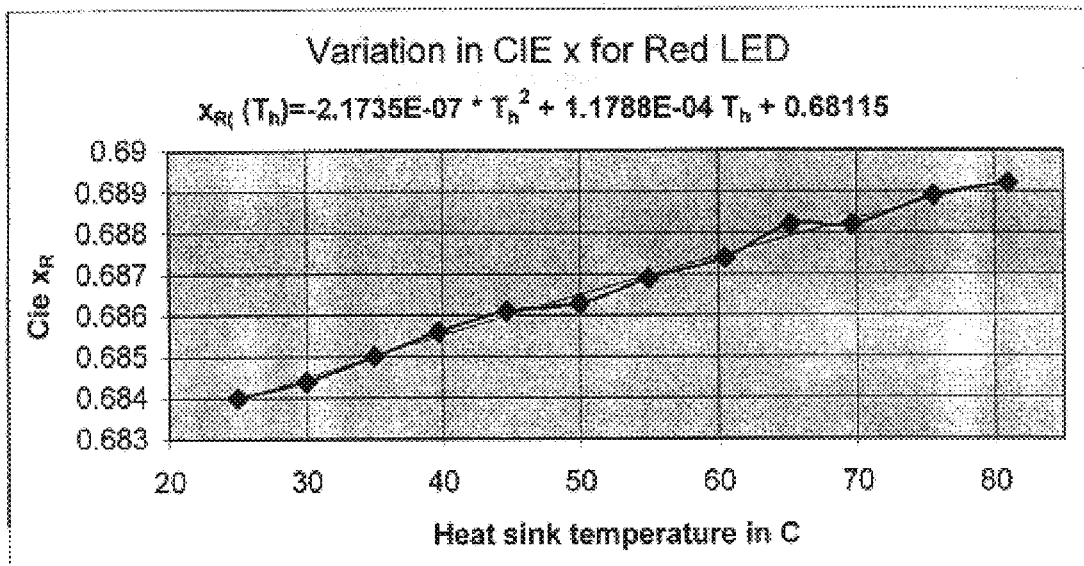
FIG. 2A is a graph showing the variation in CIE $x_R$ coordinate for a red LED in an array as a function of temperature.
Figure 2B:
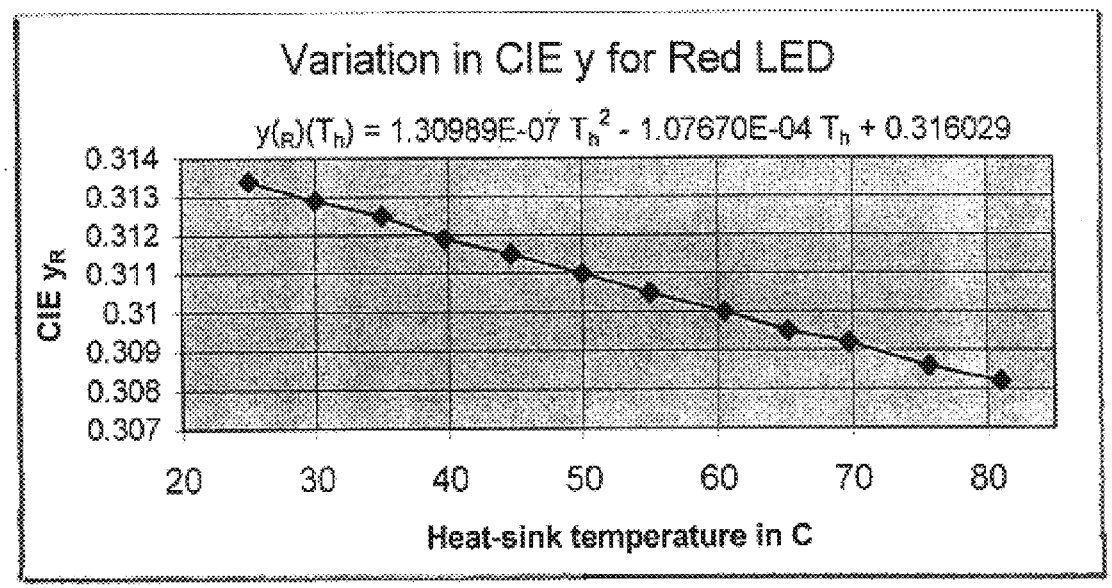
FIG. 2B is a graph showing the variation in CIE $y_R$ coordinate for a red LED in an array as a function of temperature.
Figure 3A:
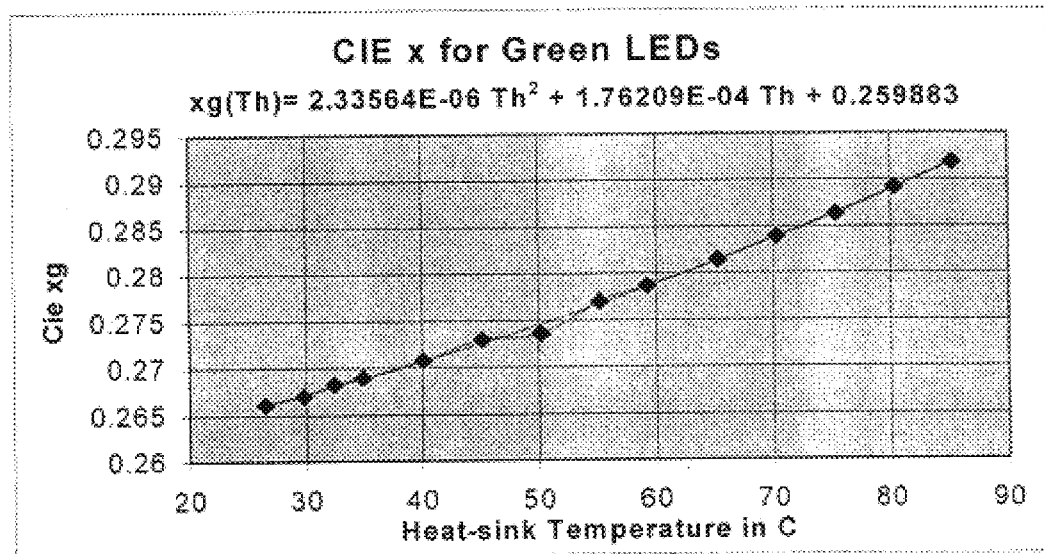
FIG. 3A is a graph showing the variation in CIE $x_G$ coordinate for a green LED in an array as a function of temperature.
Figure 3B:
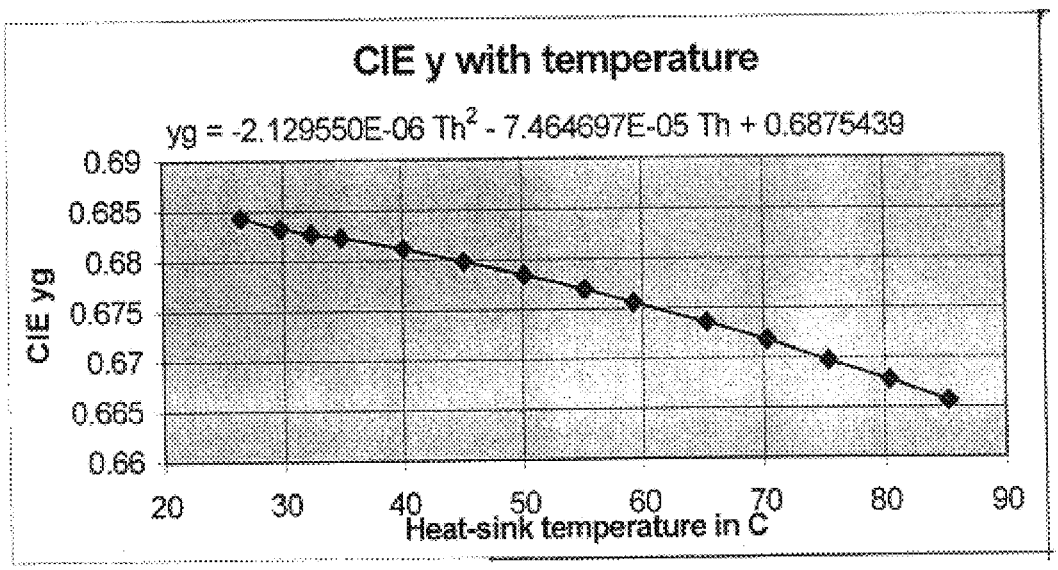
FIG. 3B is a graph showing the variation in CIE $y_G$ coordinate for a green LED in an array as a function of temperature.
Figure 4A:
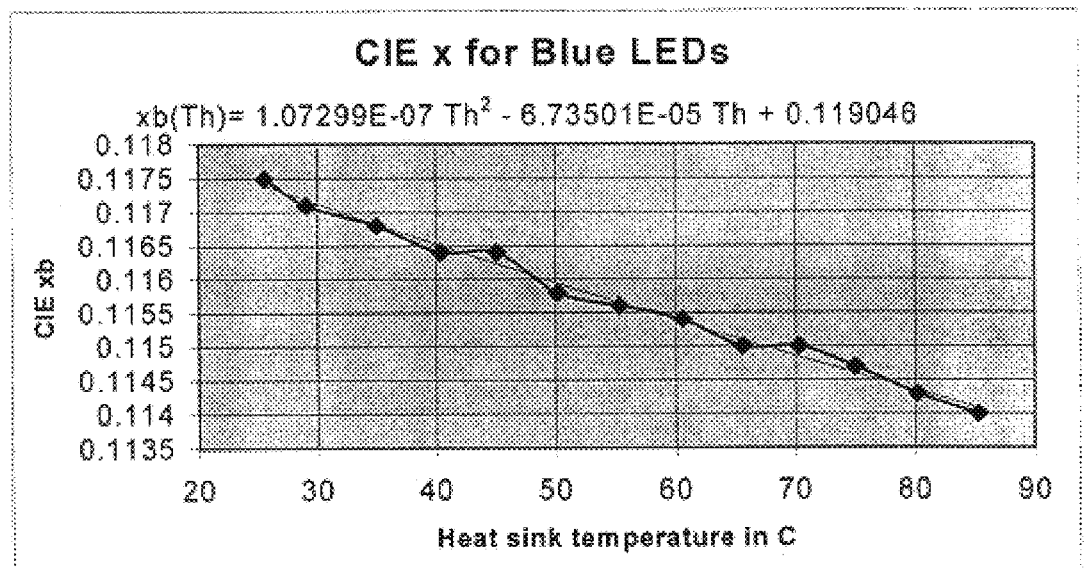
FIG. 4A is a graph showing the variation in CIE $x_B$ coordinate for a blue LED in an array as a function of temperature.
Figure 4B:
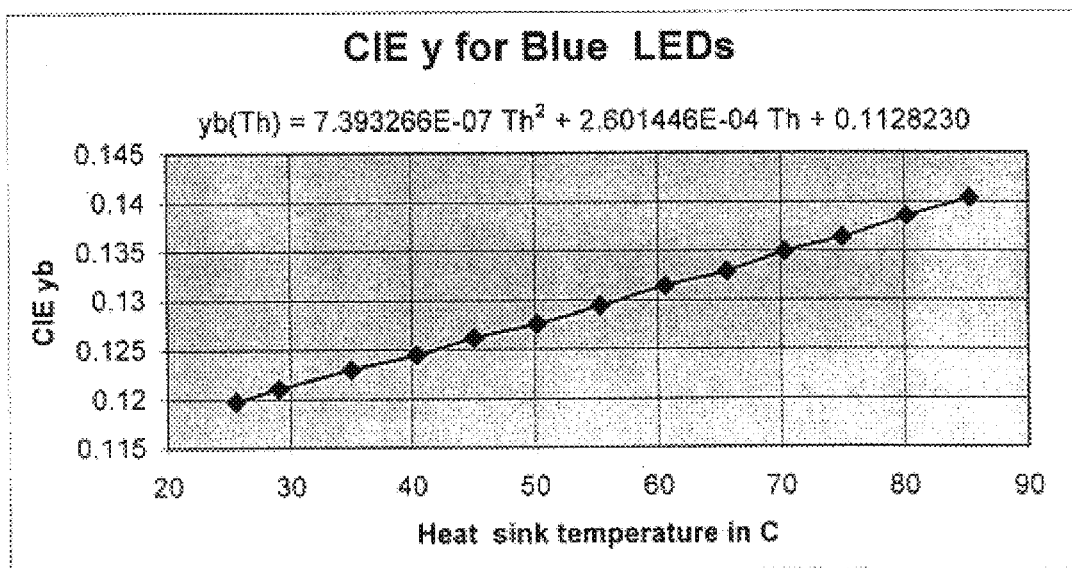
FIG. 4B is a graph showing the variation in CIE $y_B$ coordinate for a blue LED in an array as a function of heat-sink temperature.

Referring to FIG. 1, an LED luminaire according to an exemplary embodiment of the invention includes a two-dimensional array of LEDs 10, 12, 14 including a plurality of LEDs in each of a plurality of colors. The LEDs 10, 12, 14 receive power from power supply 9 which sends current through LED drivers 11, 13, 15. The array includes red LEDs 10, green LEDs 12, and blue LEDs 14 contained within a heat sink 18. The LEDs are arranged so that the overall light output will be combined by mixing optics 22 mounted outside the heat sink 18. LEDs in additional colors, such as amber may be used to enhance the mixing options.

At least one photosensor 24, e.g., a photodiode, is arranged to sense the light intensity of all the LEDs in the array. Preferably, an optical fiber (not shown) couples light from the array to the photosensor 24, which generates corresponding current signals and sends them to a controller 30 via feedback line 26.

The LED luminaire in FIG. 1 also includes a temperature sensor 33, such as a thermometer, coupled to a micro-controller or microprocessor unit 34 for calculating CIE xy coordinates for each LED light source for different heat-sink temperatures. Micro-controller 34 is coupled to a memory 36 for storing expressions of CIE xy coordinates as a function of the heat-sink temperatures. Micro-controller 34 derives equations for the CIE x and CIE y coordinates as a function of heat-sink temperature and calculates the CIE xy coordinates and lumen outputs for the RGB LED arrays on-line. Settings inputted into the micro-controller by a user input control 35, such as a potentiometer, control the light output and color temperature of the LEDs based upon the calculated CIE xy coordinates and lumen outputs for the RGB LED arrays.

The production of white light by using the light outputs from Red, Green, and Blue LED light sources is well known in the art. The following equation relates the CIE xy coordinates for each LED array and the lumen outputs from each to determine the lumen output and CIE xy coordinates of white light produced. Let $(x_R, y_R)$, $(x_G, y_G)$, and $(x_B, y_B)$ be the respective coordinates for the Red, Green, and Blue LED light sources in the CIE xy chromaticity diagram. Let the lumen outputs from the Red, Green, and Blue LED light sources be denoted as $L_R$, $L_G$, and $L_B$ respectively. If $(x_W, y_W)$ and $L_W$ are the coordinates and the lumen output for the mixed light (white light), then the following equation (1) expresses the relationship between these quantities:

$$\begin{bmatrix} \frac{x_w}{y_w} L_w \\ \frac{1}{y_w} L_w \\ L_w \end{bmatrix} = \begin{bmatrix} \frac{x_R}{y_R} & \frac{x_G}{y_G} & \frac{x_B}{y_B} \\ \frac{1}{y_R} & \frac{1}{y_G} & \frac{1}{y_B} \\ 1 & 1 & 1 \end{bmatrix} \begin{bmatrix} L_R \\ L_G \\ L_B \end{bmatrix} \quad (1)$$

If the chromaticity coordinates and the required lumen output of the white light and the chromaticity coordinates of the Red, Green, and Blue LED light sources are known, then the required lumen outputs from the Red, Green, and Blue LED light sources can be calculated by using equation (1). The Chromaticity coordinates $(x_W, y_W)$ for the white light are chosen based on the desired color of the white light. Then, knowing the CIE xy coordinates of the LED light sources the required lumen outputs $L_R$, $L_G$, and $L_B$ are calculated. Since a lumen output control system is required to regulate the lumen outputs of the LED arrays regardless of the changes in temperature and aging, the calculated reference values are supplied to such a control system.

However, the CIE xy coordinates for Red, Green, and Blue LEDs also vary with the temperature and the variations make the color of the white light drift from the target color point of the white light. To overcome this problem, first, the CIE xy coordinates for the LEDs are measured at different heat sink temperatures. Then, the CIE xy coordinates are expressed as a function of temperature by using polynomials. For the control of the color, the temperature of the heat sink is measured and the CIE xy coordinates and the lumen output fractions are then calculated on-line. Since the variations in CIE xy coordinates are stored in the form of expressions, control of the LEDs is not performed in discrete steps, and this approach eliminates the need for large arrays in order to maintain desired accuracy.

An LED manufacturer data sheet supplies the peak wavelength, the dominant wavelength, the spectral half-width maximum wavelength and the variation in the peak wavelength with the temperature. Using this information, the CIE xy coordinates for the LEDs can be calculated using a guassian or Lorentzian line-shape for the spectra of the LEDs. The variation in the CIE x and y chromaticity coordinates for the LED can also be calculated. Then knowing the thermal coefficient for the heat sink and the arrangement of the LEDs in the heat sink, the CIE xy coordinates are obtained as a function of temperature.

An LED light source is constructed with more than one LED of the same type, and the characteristics of each LED in an LED light source are not identical due to batch-to-batch variations. Therefore, the CIE x and CIE y coordinates of the LED arrays are measured experimentally in order to obtain the CIE x and CIE y coordinates for the proper non-incremental control of color of the white light.

The CIE xy chromaticity coordinates also vary with the forward current. The forward current for the LED arrays can be regulated, for example, by means of Amplitude Modulation (AM) or Pulse-width-modulation (PWM). If the amplitude modulation scheme is used, then CIE xy chromaticity coordinates with the temperature are measured for the average current for the operation. In the PWM scheme, the effect of forward current on the CIE xy coordinates is eliminated due to the constant peak current. Here, the CIE xy coordinates with the temperature are measured at the peak current.

The variation in CIE x and CIE y coordinates with the heat-sink temperature for the Red, Green, and Blue LED arrays are shown in FIGS. 2A, 2B, 3A, 3B, 4A, and 4B. The variation in CIE x and CIE y are non-linear and therefore, second order polynomials are used to express them.

The CIE x and CIE y coordinates for the Red and Blue LEDs can then be expressed by using first-order polynomials. Higher-order polynomials can also be used. Since the CIE y coordinate for the Green LED is non-linear, it is expressed by using a second-order polynomial.

CIE x and CIE y coordinates of the LED light sources are obtained by using polynomials as a function of heat-sink temperature as follows:

$x_R(T_H) = -2.1735 \times 10^{-07} T_H^2 + 1.1788 \times 10^{-4} T_H + 0.6816$ $y_R(T_H) = -1.30989 \times 10^{-07} T_H^2 - 1.0767 \times 10^{-4} T_H + 0.316029$ $x_G(T_H) = 2.33564 \times 10^{-06} T_H^2 + 1.76209 \times 10^{-06} T_H + 0.259883$ $y_G(T_H) = -2.12955 \times 10^{-6} T_H^2 - 7.464697 \times 10^{-5} T_H + 0.6875439$ $x_B(T_H) = 1.07299 \times 10^{-07} T_H^2 - 6.73501 \times 10^{-05} T_H + 0.119046$ $y_B(T_H) = 7.393266 \times 10^{-7} T_H^2 + 2.601446 \times 10^{-4} T_H + 0.112823$ Where $T_H$ is heat-sink temperature. In practice, these experimental expressions must be derived based on the measurements taken for the complete operating range of the temperature.

The above experimental expressions are useful when the variable color for the white light is desired because the reference lumens for the LED light sources need to be calculated for each color temperature. If color of the white light is fixed, then the reference lumen for the LED light sources are calculated off-line and are expressed as a function of heat-sink temperature using polynomials. This approach reduces the amount of calculations and directly supplies the reference lumen. This method is illustrated in the following example.

Figure 5:
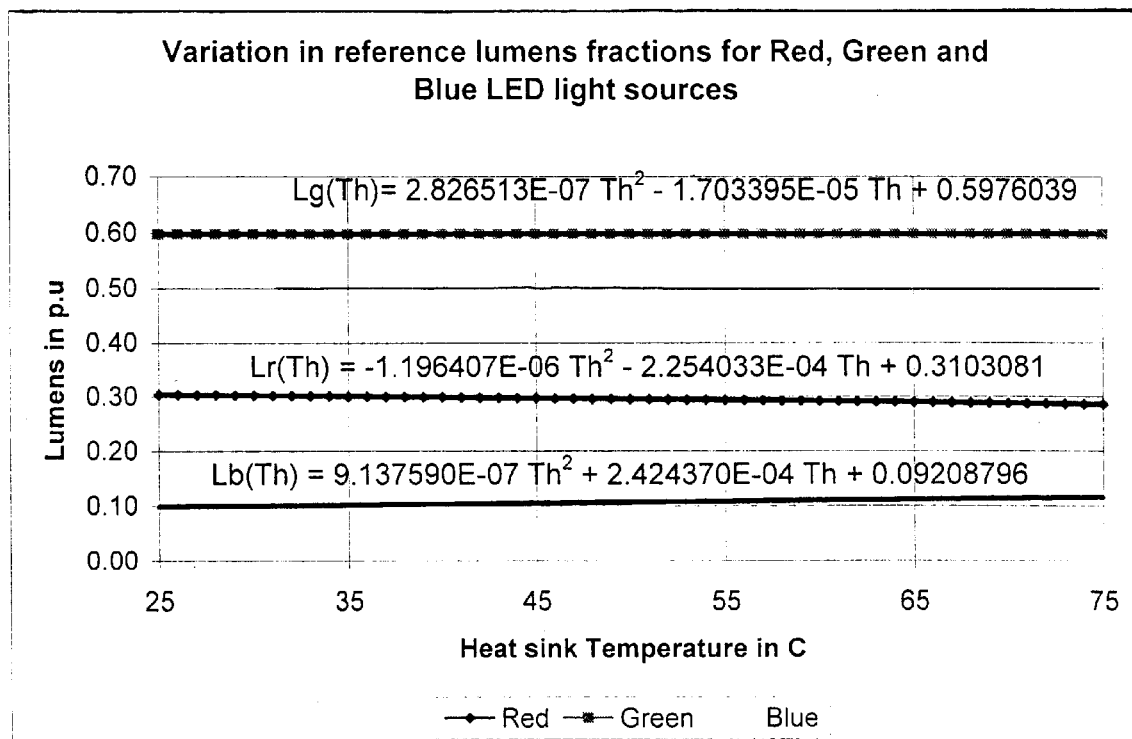
FIG. 5 is a graph showing the variation in reference lumen output fractions for red, green, and blue LED light sources as a function of temperature.

Let the desired color temperature for the white light be cool-white with the CIE x and CIE y coordinates of (0.372, 0.375) corresponding to a color temperature of 4250° K. The reference lumen output fractions are calculated using the experimental expressions above for the temperature range of 25° C. to 75° C., as shown in FIG. 5. The required lumens $L_R$, $L_G$, and $L_B$ for the Red, Green, and Blue LED light sources are expressed as a function of heat-sink temperature and the required lumen output of white light $L_W$.

$$L_R(T_H)=(-1.196407\times10^{-6}*T_H-2.254033\times10^{-4}*T_H+0.3103081)*L_W$$

$$L_G(T_H)=(-2.826513\times10^{-7}*T_H-1.703395\times10^{-5}*T_H+0.5976039)*L_W \quad L_B(T_H)=(9.13759\times10^{-7}*T_H+2.42437\times10^{-4}*T_H+0.09208796)*L_W$$

where $L_W$ is the required total lumen for the white light. Similar expressions can be found for different color of white light.

In accordance with another embodiment of the invention, the color temperature for the white LED luminary can be uniformly varied when variable color temperature for the white light is desired. In equation (1), $x_W$ and $y_W$ are the CIE chromaticity coordinates of the white light which are selected from the blackbody locus based on the desired color temperature of white light. Therefore, the values for $x_W$ and $y_W$ lie on the blackbody locus. If $x_W$ and $y_W$ are expressed as a function of color temperature, then by knowing the color temperature, the required value for $x_W$ and $y_W$ can be calculated. The desired color temperature of the white light can be set by a potentiometer.

FIGS. 6A and 6B show the variation in $x_W$ and $y_W$ with the color temperature for a color temperature range of 2500° K. to 6500° K. The value of $x_W$ and $y_W$ lie on the blackbody locus. Here, the chromaticity coordinates for the white light are expressed as a function of color temperature $T_C$ by using the following second-order polynomial expressions:

$$x_W(T_C)=8.55478\times10^{-9}*T_C^2-1.15667\times10^{-4}*T_C+0.707802$$

$$y_W(T_C)=1.4522\times10^{-9}*T_C^2-3.68337\times10^{-5}*T_C+0.500441$$

The desired color temperature can also be set by a potentiometer. Knowing the color temperature, the CIE coordinates $x_W$ and $y_W$ can be calculated using the above second-order polynomial expressions and the color temperature for the white light can be varied uniformly. Similar expressions can be obtained for different color temperature ranges using polynomials.

The preceding expressions and examples are exemplary and are not intended to limit the scope of the claims which follow.

What is claimed is:

1. A method for driving an array of LEDs comprising at least one LED in each of a plurality of colors in a luminaire comprising the steps of:

supplying electrical current to said LEDs in each said color, such that said LEDs have a light output with a nominal continuous value during ordinary operation;

measuring CIE xy coordinates for each LED light source for different temperatures;

storing the expressions of the CIE xy coordinates as a function of the temperatures;

deriving equations for the CIE x and CIE y coordinates as a function of temperature;

calculating the CIE xy coordinates and lumen output fractions on-line; and controlling the light output and color of said LEDs based upon the calculated CIE xy coordinates and lumen output fractions.

2. The method of claim 1, wherein the deriving step further comprises deriving the equations for the CIE x and CIE y coordinates as a function of temperature using polynomials.

3. The method of claim 1, wherein the deriving step further comprises deriving the equations for the CIE x and CIE y coordinates as a function of temperature using higher order polynomials.

4. The method of claim 1, wherein reference lumens are calculated off-line for a fixed color of the white light.

5. The method of claim 1, wherein the temperatures are measured from a heat-sink.

6. A method of linearly varying the color temperature of white light produced by an array of LEDs comprising at least one LED in each of a plurality of colors in a luminaire to a desired color temperature comprising the steps of:

measuring a first lumen output of the white light;

measuring a temperature of the white light;

expressing CIE xy chromaticity coordinates of the white light as a function of color temperature using polynomials;

calculating a required reference second lumen output for LED light sources from CIE xy chromaticity coordinates of the white light for the desired color temperature and the CIE xy coordinates of the LED light sources depending on the temperature;

supplying the first and second lumen outputs to a lumen output control system and regulating the lumen output of the LED light source.

7. The method of claim 6, wherein the CIE xy chromaticity coordinates vary with forward current for the array of LEDs.

8. The method of claim 7, wherein the forward current is supplied by amplitude modulation.

9. The method of claim 7, wherein the CIE xy chromaticity coordinates are measured for the average current over an operation.

10. The method of claim 9, wherein the CIE xy chromaticity coordinates are measured at peak current.

11. The method of claim 6, wherein the forward current is supplied by pulse-width-modulation.

12. The method of claim 6, wherein the temperature is a temperature of a heat-sink.

13. A luminaire comprising:

an array of LEDs comprising at least one LED in each of a plurality of colors;

means for supplying electrical current to said LEDs in each said color, said LEDs in each said color having a light output, such that said light output has a nominal continuous value during ordinary operation;

at least one photodiode arranged to measure the light outputs of at least one of the LEDs in the array;

a means for measuring CIE xy coordinates for each LED light source for different heat-sink temperatures;

a storage means storing expressions of CIE xy coordinates as a function of the temperatures;

a calculating means for deriving equations for the CIE x and CIE y coordinates as a function of temperature and calculating the CIE xy coordinates and lumen output fractions on-line; and a control means for controlling the light output and color temperature of said LEDs based upon the calculated CIE xy coordinates and lumen output fractions.

14. The luminaire as recited in claim 13, wherein the control means further comprises a potentiometer.

15. The luminaire as recited in claim 13, wherein the temperature is measured from a heat-sink encasing the LED array.

* * * * *